Figure 1:
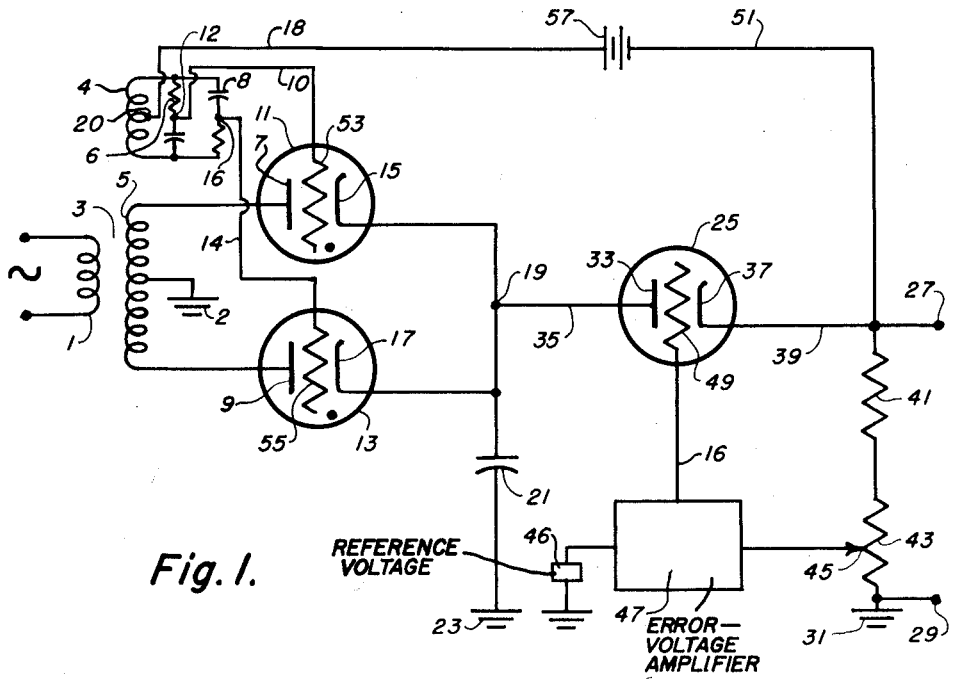

June 21, 1960   M. C. HOLTJE   2,942,172
METHOD OF AND SYSTEM FOR SUPPLYING POWER
Filed Feb. 20, 1956

Inventor
Malcolm C. Holtje
by Rines and Rines
Attorneys

United States Patent Office 2,942,172
Patented June 21, 1960

2,942,172
METHOD OF AND SYSTEM FOR SUPPLYING POWER

Malcolm C. Holtje, West Concord, Mass., assignor to General Radio Company, Cambridge, Mass., a corporation of Massachusetts Filed Feb. 20, 1956, Ser. No. 566,425

9 Claims. (Cl. 321—18)

The present invention relates to methods of and systems for supplying power and, more particularly, to electronic power-supply systems for converting alternating-current energy into regulated direct-current energy.

The art has for some time tried to provide small, low-cost and efficient regulated power supplies for converting alternating-current energy into direct-current energy for use in the electrical, electro-mechanical and electronic fields. Many different types of regulated power supplies have been evolved including those employing electron regulator tubes, gaseous rectifiers, and other types of rectifying elements. Those systems utilizing rectifiers of, for example, the gaseous-discharge type, such as thyratrons, have the advantage that they do not dissipate a large amount of the power fed into the power-supply system. This is because they are on-off switching devices which open and close the rectifying circuit and thus provide for the rectifying of the input alternating-current energy without dissipating appreciable quantities of the input power. This type of power supply, unfortunately, can present a high output impedance when the thyratrons are conducting over a relatively small portion of the cycle of the alternating-current input voltage. Spikes or transient effects, moreover, are produced by the switching of such gaseous-discharge rectifier tubes, giving rise to the necessity for smoothing or filtering of the output voltage of the power supply. Very complex and bulky filtering systems have been required to produce a reasonably constant direct-current output voltage in such power-supply systems. From the commercial point of view, therefore, many branches of the electrical industry have preferred not to employ thyratron rectifiers.

Other types of power supplies utilize regulator tubes, either series-connected or shunt-connected, to provide for the regulation of the output voltage of the power-supply system through feeding back a part of the output voltage to control the impedance of the regulator tubes in accordance with variations in the output voltage. Such power-supply systems, however, have again been quite sizeable and costly because the regulator tube is called upon to absorb appreciable portions of the input power in the process of regulating the power-supply voltage. This is particularly true if the output voltage is to be varied over a relatively large range. Such systems have an advantage, however, for many purposes in that they are inherently relatively low-output-impedance devices.

An object of the present invention is to provide a new and improved method of an apparatus for supplying direct-current power from alternating-current energy.

A further object is to provide such a method and apparatus that shall not be subject to the disadvantages above set forth, but that shall, to the contrary, embody both the advantages of gaseous-discharge power-supply systems and the advantages of regulator-tube systems, without the disadvantages of either of the systems.

An additional object is to provide such a power-supply system that shall dissipate relatively little input power and can be manufactured in small size and at reduced cost.

Other and further objects will be explained hereinafter and will be more particularly pointed out in the appended claims.

Figure 2:
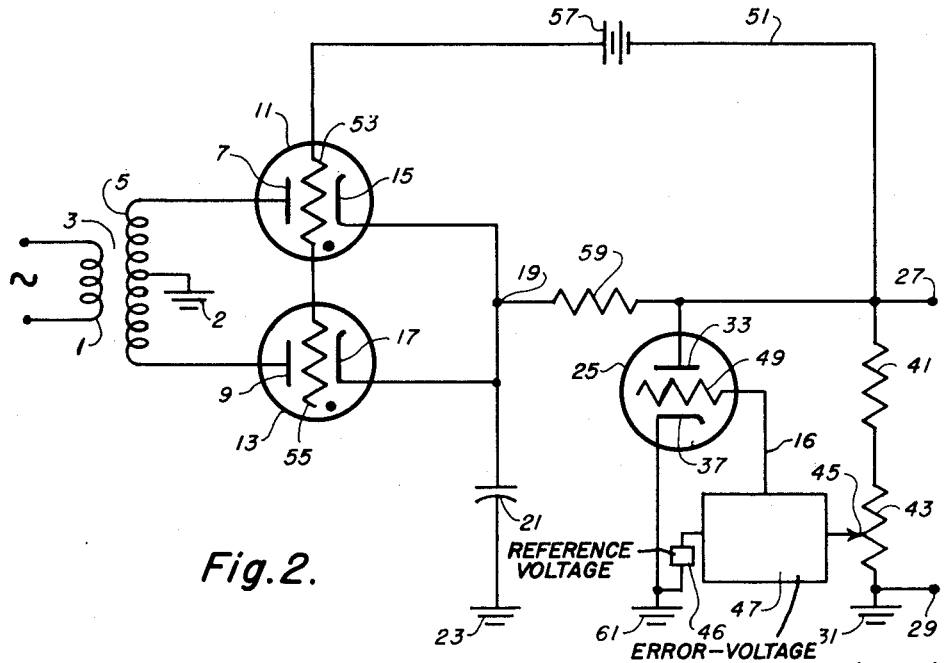

The invention will now be described in connection with the accompanying drawings, Fig. 1 of which is a circuit diagram of a power-supply system constructed in accordance with a preferred embodiment of the present invention; and Fig. 2 is a similar diagram of a modification.

Alternating-current energy is shown supplied to a primary winding 1 of a power transformer 3, the secondary winding 5 of which is connected in the input circuit of the power-supply system. The secondary winding 5 is shown intermediately grounded at 2 and its upper and lower terminals are shown connected to the respective anodes 7 and 9 of a pair of preferably similar rectifier tubes 11 and 13. The rectifier tubes 11 and 13 are preferably of the gaseous-discharge thyratron type, though from the broad point of view, other types of voltage switching or voltage-interrupting uni-directionalizing devices, including magnetic amplifiers, may be similarly employed. The cathodes 15 and 17 of the voltage-switching or rectifying tubes 11 and 13 are shown connected together at 19 and through a voltage storing capacitor or capacitors 21 to the ground terminal 23. The rectifiers 11 and 13 operate alternately as a result of their connection to the opposite or out-of-phase terminals of the secondary winding 5, this operation occurring synchonously with the alternating-current frequency. A rectified voltage is thereby produced that is stored in the capacitor or capacitors 21. In order to control smoothly the firing angle of the thyratrons 11 and 13, they may be provided with a mains-voltage grid-bias component shifted substantially ninety degrees with respect to the mains voltage applied by the secondary winding 5 to the anodes 7 and 9. This bias may be effected by a further secondary winding 4 shunted by a pair of oppositely arranged resistance-capacitance phase-shifting networks 6 and 8. A conductor 10 connects from a ninety-degree phase shift terminal 12 of the network 6 to the control-grid electrode 53 of the thyratron 11. A similar connection is provided by the conductor 14 from the intermediate terminal 16 of the network 8 to the control grid 55 of the thyratron 13.

In accordance with the present invention, a regulator tube, such as a regulator triode 25, is connected in series circuit between the cathodes 15 and 17 and the upper output terminal 27 of the power-supply system, the other output terminal 29 being shown grounded at 31. The anode 33 of the regulator tube 25 is connected by the conductor 35 to the junction 19 of the cathodes 15 and 17, and the cathode 37 of the regulator tube 25 is connected through conductor 39 to the output terminal 27. The output voltage may be taken across the resistor network 41, 43, disposed between the output terminals 27 and 29. As in the conventional use of series-regulator tubes, the impedance of the regulator tube 25 may be varied in accordance with voltage variations appearing at the output terminals 27 and 29, resulting, for example, from line-voltage or output-load variations, by taking a part of the output voltage from the tap 45, comparing this with a suitable voltage reference 46, amplifying the difference between the compared voltages in the error-voltage amplifier 47, and feeding back an amplified error signal by conductor 16 to the control-grid electrode 49 of the regulator tube 25. Variations in the output voltage appearing at the terminals 27 and 29 are thus caused to vary the impedance of the regulator tube 25 through the feed-back path 45—47—16, thereby compensating for these variations.

By feeding back the output voltage by conductor 51, through a source of potential 57, to the control-grid electrodes 53 and 55 of the rectifiers 11 and 13, the operation of the rectifiers 11 and 13 may be controlled to maintain the anode 33 of the series-regulator tube 25 at a more positive predetermined potential than the cathode 37. The electrical connections of this feed-back path may be traced from the left-hand terminal of the source 57 by conductor 18 to an intermediate terminal 20 of the secondary winding 4, thence through the upper and lower sections of the secondary winding 4 and the respective resistors of the phase-shifting networks 6 and 8 to respective conductors 10 and 14 which, in turn, connect with the respective control-grid electrodes 53 and 55. The energy stored in the capacitor 21 will be sufficient to maintain the input voltage to the series-regulator tube 25 during the cycle between non-conduction and conduction of the rectifiers 11 and 13. If the input voltage to the series-regulator tube 25, i.e. the voltage across the capacitor 21, should drop, for example, the potential of the cathodes 15 and 17, which are directly connected to the capacitor 21, will also drop. The potential of the grids 53 and 55, however, is held constant by the action of the series-regulator tube 25 and the source of potential 57. Thus the grid-to-cathode voltage of the rectifiers 11 and 13 will change, the grid becoming more positive with respect to the cathode, and the firing angle will increase until the voltage across the capacitor 21 is restored to its former value. This action will maintain substantially the desired predetermined voltage differential between the anode 33 and the cathode 37 of the series-regulator tube 25.

The range of variation of the voltage differential between the regulator-tube anode 33 and cathode 37 is thus greatly limited through the use of the switching rectifiers 11 and 13, and the series-regulator tube 25 provides a fast-acting control for good transient performance.

The combined use of the switching rectifiers 11 and 13 and the series-regulator tube 25, indeed, permits the output voltage to vary over large ranges without increasing the amount of energy dissipated in the series-regulator tube 25, as would be the case with conventional series-regulator-tube power-supply systems. Relatively small-size and relatively inexpensive equipment can therefore be employed, in accordance with the present invention. The regulator tube 25, moreover, acts in conjunction with the storage capacitor 21 as an inherent filter device so that the voltage spikes due to transient operation of the rectifiers 11 and 13 are substantially eliminated. In addition, the system provides the desirable low-impedance output.

While the system of Fig. 1 is illustrated in connection with the preferred series regulator tube 25, a shunt-connected regulator tube 25, as shown in Fig. 2, may be employed in conjunction with a series impedance 59 disposed between the cathodes 15 and 17 of the rectifier tubes 11 and 13 and the output terminal 27. The cathode 37 of the regulator tube 25 is grounded at 61 and the plate 33 is shown connected to the right-hand terminal of the impedance 59. In this case, the shunt-connected regulator tube 25 is operated so that the principal dissipation of power takes place in the series resistor 59. This circuit would be particularly useful for high-voltage low-current power supply systems. The same control-grid mains-derived phase-shifted bias voltage, developed by the circuit 4, 6, 8 of Fig. 1, may also be employed with the circuit of Fig. 2.

As a typical illustration, the system of Fig. 1 has been operated successfully with conventional mains input voltage to produce adjustable output voltages in the range of from 0 to 300 volts, delivering from 0 to 200 milliamperes. The tubes 11 and 13 may be of the thyratron type 2D21, and the regulator tube 25 may be of the type 6080. With the present invention, a maximum power dissipation in the series-regulator tube 25 of about 10 watts is required. If a conventional series-regulator power supply were used, on the other hand, a total power dissipation of about 85 watts would be required to accomplish the same result. This ratio of 8.5-to-1 is reflected in marked reduction in manufacturing costs and equipment size.

Further modifications will occur to those skilled in the art and all such are considered to fall within the spirit and scope of the invention as defined in the appended claims.

What is claimed is:

1. A power supply having an alternating-current input and an output, switching means connected to the input and operating synchronously with the alternating-current input, energy-storing means for storing the energy from the switching means, voltage-regulator means connected between the energy storing means and the output, and feedback means connected between the output and the switching means to control the voltage obtained from the switching means in accordance with variations in the voltage across the voltage-regulator means, thereby to limit the range of voltage developed across the voltage-regulator means.

2. A power supply having an alternating-current input and a direct-current output, switching means connected to the input and operating synchronously with the alternating-current input, energy-storing means for storing the energy from the switching means, voltage-regulator means connected between the energy-storing means and the output, first feedback means connected between the output and the voltage-regulator means for controlling the same in accordance with variations in the voltage at the output, and second feedback means including a source of potential connected between the output and the switching means to control the voltage obtained from the switching means in accordance with variations in the voltage across the voltage-regulator means, thereby to limit the range of voltage developed across the voltage-regulator means.

3. A power supply having an alternating-current input and a direct-current output, voltage-rectifying means connected to the input, energy-storing means for storing the rectified voltage, a regulator tube connected between the energy-storing means and the output, and feedback means connected between the output and the rectifying means to control the voltage obtained from the rectifying means in accordance with variations in the voltage across the regulator tube, thereby to limit the range of voltage developed across the regulator tube.

4. A power supply having an alternating-current input and a direct-current output, voltage-rectifying means connected to the input, energy-storing means for storing the rectified voltage, a regulator tube connected between the energy-storing means and the output, first feedback means including an amplifier connected between the output and the regulator tube for controlling the same in accordance with variations in the voltage at the output, and second feedback means including a source of potential connected between the output and the rectifying means to control the voltage obtained from the rectifying means in accordance with variations in the voltage across the regulator tube, thereby to limit the range of voltage developed across the regulator tube.

5. A power supply having an alternating-current input and a direct-current output, gaseous-discharge rectifying means connected to the input, energy-storing means for storing the rectified voltage, a regulator tube connected between the energy-storing means and the output, first feedback means including an amplifier connected between the output and the regulator tube for controlling the same in accordance with variations in the voltage at the output, and second feedback means including a source of potential connected between the output and the rectifying means to control the voltage obtained from the rectifying means in accordance with variations in the voltage across the regulator tube, thereby to limit the range of voltage developed across the regulator tube.

6. A power supply having an alternating-current input transformer and a direct-current output, a pair of gaseous-discharge rectifying means each having an anode, a control electrode and a cathode, means for connecting the anodes of the pair of rectifying means to opposite terminals of the input transformer, energy-storing means connected to the cathodes of both the rectifying means for storing the rectified voltage produced by the pair of rectifying means, a regulator tube having an anode, a control electrode and a cathode, means for connecting the anode and cathode of the rectifier in circuit between the energy-storing means and the output, a first feedback path including an amplifier connected between the output and the control electrode of the regulator tube for controlling the regulator tube in accordance with variations at the output, and a second feedback path including a source of direct-current potential connected between the output and the control electrodes of both of the pair of rectifying means to control the voltage obtained from the rectifying means in accordance with variations in the voltage across the regulator tube, thereby to limit the range of voltage developed across the regulator tube.

7. A power supply having an alternating-current input transformer and a direct-current output, a pair of gaseous-discharge rectifying means each having an anode, a control electrode and a cathode, means for connecting the anodes of the pair of rectifying means to opposite terminals of the input transformer to apply anti-phase alternating-current voltages thereto, means for biasing the control electrodes with alternating-current voltages substantially ninety-degrees phase-shifted with respect to the alternating-current voltages applied to the anodes by the input transformer, energy-storing means connected to the cathodes of both of the rectifying means for storing the rectified voltage produced by the pair of rectifying means, a regulator tube having an anode, a control electrode and a cathode, means for connecting the anode and cathode of the regulator tube in circuit between the energy-storing means and the output, a first feedback path including an error amplifier connected between the output and the control electrode of the regulator tube for controlling the regulator tube in accordance with variations at the output, and a second feedback path including a source of direct-current potential connected between the output and the control electrodes of both of the pair of rectifying means to control the voltage obtained from the rectifying means in accordance with variations in the voltage across the regulator tube, thereby to limit the range of voltage developed across the regulator tube.

8. A power supply having an alternating-current input transformer and a direct-current output, a pair of gaseous-discharge rectifying means each having an anode, a control electrode and a cathode, means for connecting the anodes of the pair of rectifying means to opposite terminals of the input transformer, energy-storing means connected to the cathodes of both of the rectifying means for storing the rectified voltage produced by the pair of rectifying means, a regulator tube having an anode, a control electrode and a cathode, means for connecting the anode and cathode of the regulator tube in series-circuit between the energy-storing means and the output, a first feedback path including an amplifier connected between the output and the control electrode of the regulator tube for controlling the regulator tube in accordance with variations at the output, and a second feedback path including a source of direct-current potential connected between the output and the control electrodes of both of the pair of rectifying means to control the voltage obtained from the rectifying means in accordance with variations in the voltage across the regulator tube, thereby to limit the range of voltage developed across the regulator tube.

9. A power supply having an alternating-current input transformer and a direct-current output, a pair of gaseous-discharge rectifying means each having an anode, a control electrode and a cathode, means for connecting the anodes of the pair of rectifying means to opposite terminals of the input transformer, energy-storing means connected to the cathodes of both of the rectifying means for storing the rectified voltage produced by the pair of rectifying means, a regulator tube having an anode, a control electrode and a cathode, means for connecting the anode and cathode of the regulator tube in shunt-circuit between the energy-storing means and the output, a first feedback path including an amplifier connected between the output and the control electrode of the regulator tube for controlling the regulator tube in accordance with variations at the output, and a second feedback path including a source of direct-current potential connected between the output and the control electrodes of both of the pair of rectifying means to control the voltage obtained from the rectifying means in accordance with variations in the voltage across the regulator tube, thereby to limit the range of voltage developed across the regulator tube.

References Cited in the file of this patent

UNITED STATES PATENTS

| | | |
|---|---|---|
| 2,035,125 | Grant | Mar. 24, 1936 |
| 2,095,742 | Haller | Oct. 12, 1937 |
| 2,113,220 | Power | Apr. 5, 1938 |
| 2,117,138 | Bock | May 10, 1938 |
| 2,299,942 | Trevor | Oct. 27, 1942 |
| 2,331,131 | Moyer | Oct. 5, 1943 |
| 2,431,994 | Dibrell et al. | Dec. 2, 1947 |
| 2,443,534 | Eglin | June 15, 1948 |
| 2,443,638 | Potter | June 22, 1948 |
| 2,456,638 | Kenyon | Dec. 21, 1948 |
| 2,469,176 | Potter | May 3, 1949 |
| 2,511,850 | Hoag | June 20, 1950 |
| 2,554,977 | Chapin | May 29, 1951 |
| 2,567,797 | Anderson | Sept. 11, 1951 |
| 2,630,557 | Bixby | Mar. 3, 1953 |
| 2,662,209 | Van De Wiel | Dec. 8, 1953 |